United States Patent
Lee et al.

(10) Patent No.: US 8,135,562 B2
(45) Date of Patent: Mar. 13, 2012

(54) SYSTEM, METHOD AND MEDIUM CALIBRATING GYROSENSORS OF MOBILE ROBOTS

(75) Inventors: Hyoung-Ki Lee, Seoul (KR); Ki-Wan Choi, Seongnam-si (KR); Ji-Young Park, Seongnam-si (KR); Seok-Won Bang, Yongin-si (KR); Sung-Kyung Hong, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 237 days.

(21) Appl. No.: 12/000,012

(22) Filed: Dec. 6, 2007

(65) Prior Publication Data

US 2008/0249732 A1 Oct. 9, 2008

(30) Foreign Application Priority Data

Apr. 4, 2007 (KR) .......................... 10-2007-0033455

(51) Int. Cl.
*G01P 21/00* (2006.01)

(52) U.S. Cl. ....................................... 702/151

(58) Field of Classification Search ............. 702/151
See application file for complete search history.

(56) References Cited

U.S. PATENT DOCUMENTS

| 5,367,898 | A | | 11/1994 | Matsuzaki |
| 5,421,187 | A | | 6/1995 | Morgan |
| 5,648,901 | A | * | 7/1997 | Gudat et al. .................. 701/23 |
| 6,209,383 | B1 | | 4/2001 | Muellar et al. |
| 2003/0202089 | A1 | * | 10/2003 | Alhadef et al. ............... 348/42 |
| 2009/0093984 | A1 | * | 4/2009 | Choi et al. ................... 702/104 |

FOREIGN PATENT DOCUMENTS

| JP | 2-266213 | 10/1990 |
| JP | 6-331365 | 12/1994 |
| JP | 7-83672 | 3/1995 |
| JP | 7-167658 | 7/1995 |
| KR | 10-0560966 | 3/2006 |

OTHER PUBLICATIONS

Korean Office Action for corresponding Korean Patent Application No. 10-2007-0033455 dated Apr. 21, 2008 (pp. 1-4).

* cited by examiner

*Primary Examiner* — Tung S Lau
(74) *Attorney, Agent, or Firm* — Staas & Halsey LLP

(57) ABSTRACT

Provided are a system, method and medium calibrating a gyrosensor of a mobile robot. The system includes a camera to obtain image data of a fixed environment, a rotation angle calculation unit to calculate a plurality of angular velocities of a mobile robot based on an analysis of the image data, a gyrosensor to output a plurality of pieces of raw data according to rotation inertia of the mobile robot and a scale factor calculation unit to calculate a scale factor that indicates the relationship between the pieces of raw data and the angular velocities.

19 Claims, 11 Drawing Sheets

SYSTEM, METHOD AND MEDIUM CALIBRATING GYROSENSORS OF MOBILE ROBOTS

CROSS-REFERENCE TO RELATED APPLICATIONS

This application claims priority from Korean Patent Application No. 10-2007-0033455 filed on Apr. 4, 2007 in the Korean Intellectual Property Office, the disclosure of which is incorporated herein by reference in its entirety.

BACKGROUND

1. Field

One or more embodiments of the present invention relate to a mobile robot, and more particularly, to system, method and medium calibrating a gyrosensor (gyroscope sensor) of a mobile robot.

2. Description of the Related Art

Robots or robotic devices have been developed for a variety of tasks including industrial purposes and for factory automation. Robots have also been used to perform tasks in extreme environments that human beings cannot access. Robotics has been rapidly developed as applied to the cutting-edge space development industry. Recently, even human-friendly household robots have been developed. In addition, robots have been inserted into human bodies and used to heal delicate human tissue, which was at times not possible using conventional medical devices. Such developments have drawn a lot of attention to robotics as a cutting-edge field that may soon replace other cutting-edge fields such as biotechnology and the information revolution initiated by the introduction of the Internet.

In particular, household robots have played a major role in evolving heavy industry-centered robotics, which is limited to the development of industrial robots, to light industry-centered robotics. A typical example of household robots includes cleaning robots. A cleaning robot includes a driving unit moving the cleaning robot, a cleaning unit for a cleaning operation, and a location measurement unit measuring the location of the cleaning robot or a user's remote control.

The most basic and important function of a mobile robot such as a cleaning robot, is to accurately identify its location. Techniques for calculating the absolute location of a mobile robot include a technique of implementing a beacon, which employs an ultrasonic sensor, at home and a technique using an indoor global positioning system (GPS). In addition, a technique for calculating the relative location of a mobile robot includes a technique for calculating the location of a mobile robot by obtaining the rotational velocity (angular velocity) and linear velocity of the mobile robot from an encoder and integrating the rotational velocity and the rectilinear velocity, a technique for calculating the location of a mobile robot by integrating an accelerated velocity, which is obtained from an acceleration sensor, twice and a technique for calculating the direction of a mobile robot by integrating a rotation velocity output from a gyrosensor.

A gyrosensor measures angular velocity. If the measured angular velocity is integrated once with respect to time, an angle of direction of a mobile robot can be measured. The gyrosensor calculating the location of the mobile robot may be resistant to its surrounding environment and implemented as a stand-alone device. In order to obtain accurate measurement values using the gyrosensor, correcting the bias drift of the gyrosensor and calibration of the gyrosensor must also be performed.

A bias drift denotes a variation in the signal level of a gyrosensor over time when a mobile robot is not moving, and calibration denotes mapping a signal level of raw data obtained from the gyrosensor to a real physical value (angular velocity), that is, obtaining a scale factor.

In order to correct the bias drift of a gyrosensor, a simple technique for correcting a current signal level using a signal level obtained when a mobile robot is not moving is generally used. However, no general technique for calibrating the gyrosensor is available, other than techniques using a data sheet or a rotary table.

The data sheet is a table reflecting the relationship between raw data and angular velocity, which is intermittently created by a manufacturer of a gyrosensor after conducting experiments. However, since the data sheet is created under specific conditions, it fails to take into consideration the aging of the gyrosensor or a change in scale factor according to an external temperature change.

Figure 1:
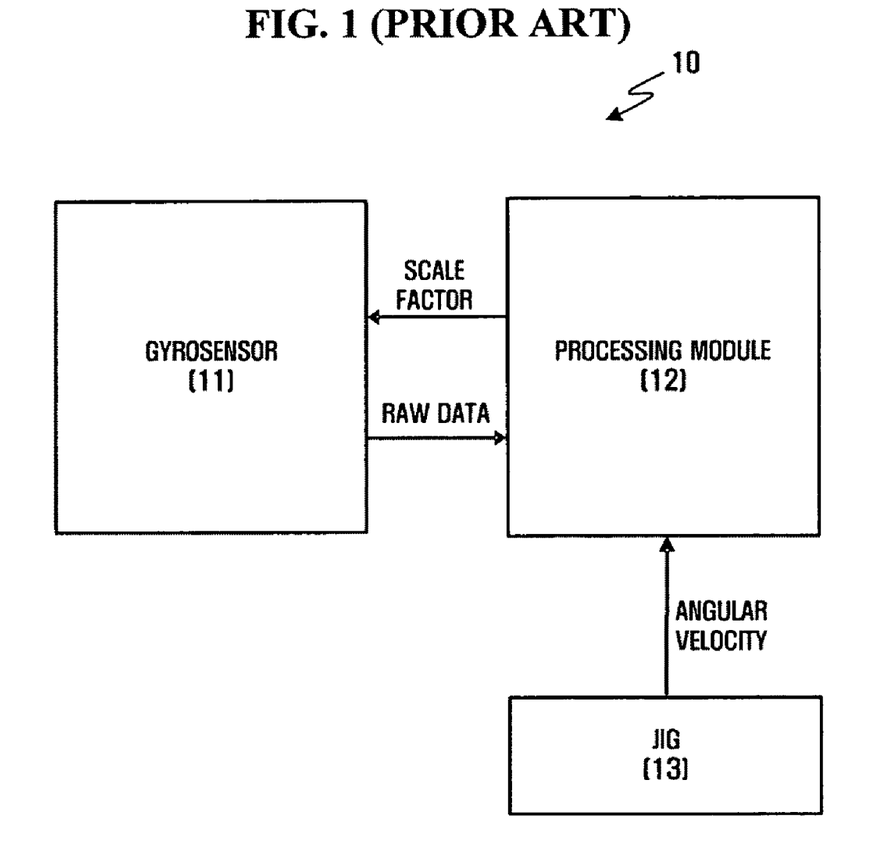
FIG. 1 illustrates a conventional mobile robot to which a conventional calibration method using a rotary table is applied.

FIG. 1 illustrates a conventional mobile robot 10 to which a conventional calibration technique using a rotary table is applied. The mobile robot 10 includes a gyrosensor 11, a jig 13, and a processing module 12. The gyrosensor 11 measures rotary inertia and outputs raw data. The jig 13 includes a rotary table rotating the mobile robot 10 and measures the angular velocity of the rotary table. The processing module 12 calculates a scale factor of the raw data based on the measured angular velocity and provides the scale factor to the gyrosensor 11.

Some of the drawbacks of the conventional mobile robot 10 are that it requires an expensive jig 13 and that calibration cannot be performed in real time while the mobile robot 10 is moving since the mobile robot 10 has to be first loaded into the jig 13 before calibration.

SUMMARY

One or more embodiments of the present invention provide a system, method and medium calibrating a gyrosensor of a mobile robot with enhanced accuracy and reduced costs.

One or more embodiments of the present invention also provide a system, method and medium calibrating a gyrosensor of a mobile robot while the mobile robot is moving.

Additional aspects and/or advantages will be set forth in part in the description which follows and, in part, will be apparent from the description, or may be learned by practice of the invention.

To achieve at least the above and/or other aspects and advantages, embodiments of the present invention include a system for calibrating a gyrosensor of a mobile robot. The system includes a camera to obtain image data of a fixed environment; a rotation angle calculation unit to calculate a plurality of angular velocities of the mobile robot based on an analysis of the image data; the gyrosensor to output a plurality of pieces of raw data according to rotation inertia of the mobile robot; and a scale factor calculation unit to calculate a scale factor that indicates the relationship between the pieces of raw data and the angular velocities.

To achieve at least the above and/or other aspects and advantages, embodiments of the present invention include a system for calibrating a gyrosensor of a mobile robot. The system includes a camera to obtain image data of a fixed environment; a rotation angle calculation unit to calculate a rotation angle of the mobile robot based on an analysis of the image data; an encoder to output encoder data according to rotation velocity of a motor; a reference angular velocity calculation unit to calculate encoder parameters using the calculated rotation angle and encoder data corresponding to the calculated rotation angle and obtaining a plurality of reference angular velocities by applying a plurality of pieces of encoder data to the calculated encoder parameters; the gyrosensor to output a plurality of pieces of raw data according to rotation inertia of the mobile robot; and a scale factor calculation unit to calculate a scale factor that indicates the relationship between the pieces of raw data and the reference p angular velocities.

To achieve at least the above and/or other aspects and advantages, embodiments of the present invention include a method of calibrating a gyrosensor of a mobile robot. The method includes obtaining image data of a fixed environment; calculating a plurality of angular velocities of the mobile robot based on an analysis of the image data; and calculating a scale factor that indicates the relationship between a plurality of pieces of raw data according to rotation inertia of the mobile robot and the angular velocities.

To achieve at least the above and/or other aspects and advantages, embodiments of the present invention include a method of calibrating a gyrosensor of a mobile robot. The method includes obtaining image data of a fixed environment; calculating a rotation angle of the mobile robot based on an analysis of the image data; calculating encoder parameters using the calculated rotation angle and encoder data corresponding to the calculated rotation angle; obtaining a plurality of reference angular velocities by applying a plurality of pieces of encoder data to the calculated encoder parameters; and calculating a scale factor that indicates the relationship between a plurality of pieces of raw data according to rotation inertia of the mobile robot and the reference angular velocities.

To achieve at least the above and/or other aspects and advantages, embodiments of the present invention include a method of calibrating a gyrosensor of a mobile robot. The method includes rotating the mobile robot in a predetermined velocity pattern; capturing image data at a predetermined location as the mobile robot rotates; estimating kinematic parameters of the mobile robot based on the captured image data; calculating a plurality of reference angular velocities in real time by applying real-time encoder data to the estimated kinematic parameters and continuously providing the calculated reference angular velocities; and calibrating the gyrosensor based on the continuously provided reference angular velocities.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

One or more embodiments of the present invention provide a method of automatically calculating a scale factor by obtaining a plurality of reference angular velocities using an image of a fixed environment (e.g., a ceiling) and mapping the reference angular velocities to output values of a gyrosensor. In this case, the method provided by embodiments of the present invention may use a weighted least square (WLS) technique in order to minimize the effect of the bias drift of the gyrosensor. The accuracy of the gyrosensor may be enhanced by appropriately selecting weights used in the WLS technique.

Figure 2:
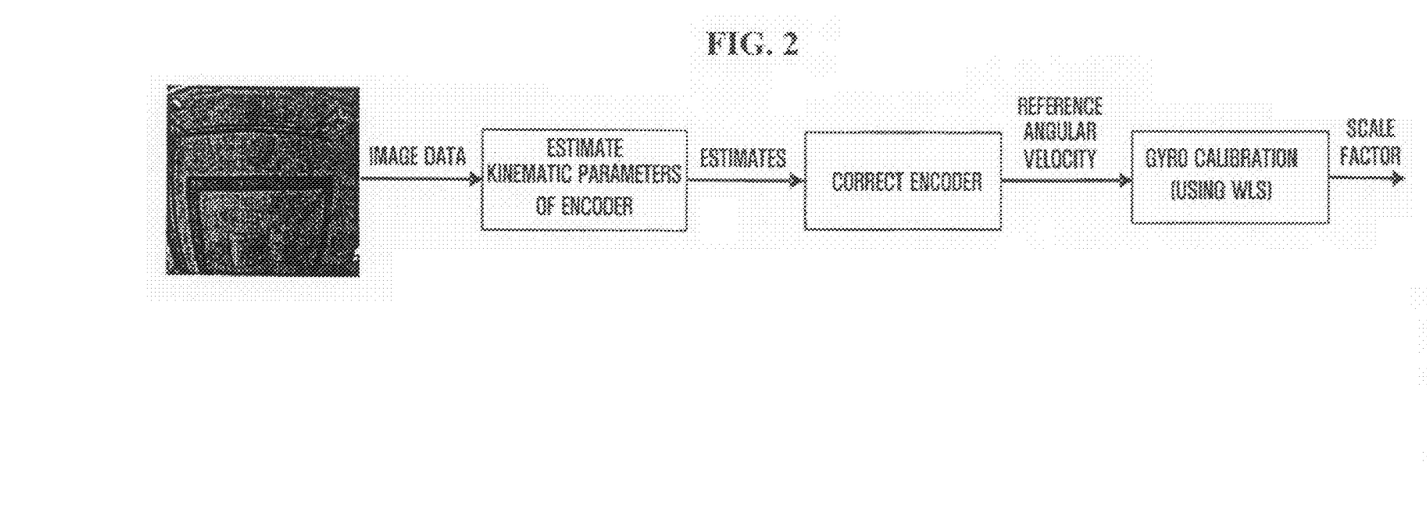
FIG. 2 illustrates a calibration process, according to a first embodiment of the present p invention.

FIG. 2 illustrates a calibration process, according to an embodiment of the present invention.

Image data obtained after photographing a fixed environment, such as a ceiling, may be used to estimate kinematic parameters of an encoder. If the encoder is corrected based on estimates of the parameters, it may provide reference angular velocities in real time. The reference angular velocities may be used for gyro calibration, and a scale factor of a gyrosensor may be obtained, e.g., using the WLS technique. That is, in an embodiment, the encoder is corrected using image data, and gyro calibration may be performed based on the reference angular velocities calculated by the corrected encoder.

Figure 3:
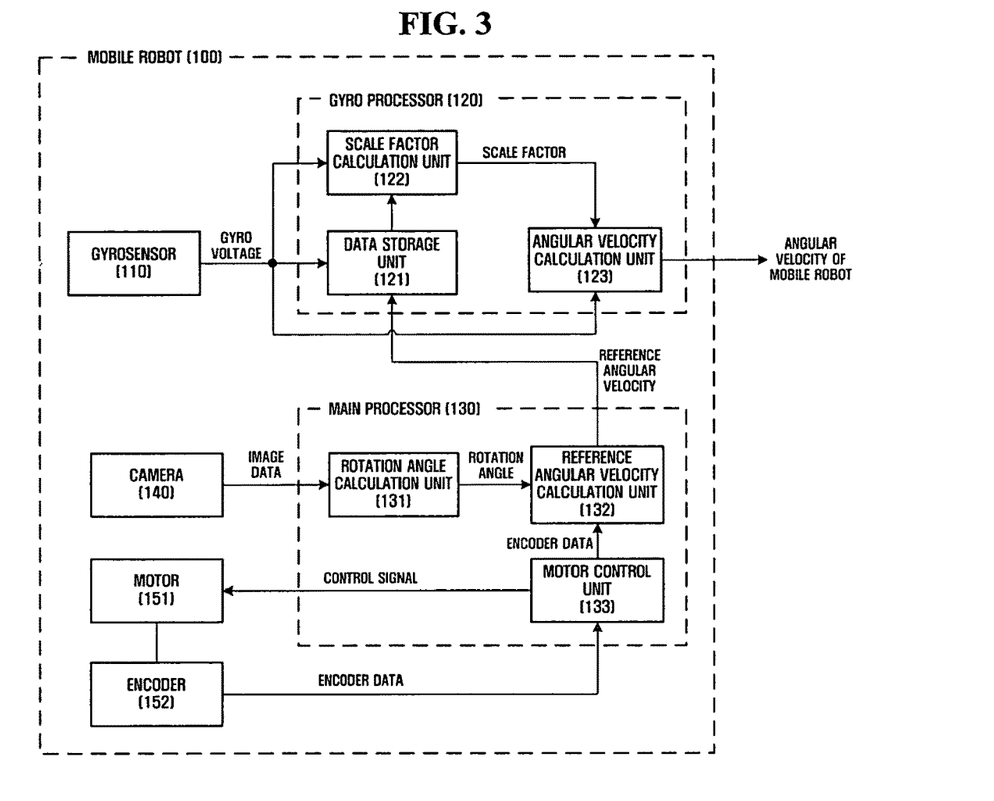
FIG. 3 illustrates a mobile robot, according to a first embodiment of the present invention.

FIG. 3 illustrates a mobile robot 100 or for a system calibrating a gyrosensor 110, according to an embodiment of the present invention. The system calibrating the gyrosensor 110 may be loaded into the mobile robot 100 and may be substantially identical to the mobile robot 100. Therefore, the system and the mobile robot 100 will be unified and referred to as the mobile robot 100.

The mobile robot 100 may include, for example, the gyrosensor 110, a gyro processor 120, a main processor 130, a camera 140, a motor 151, and an encoder 152.

The gyrosensor 110 may output raw data according to rotary inertia of the mobile robot 100. One or more embodiments of the present invention will be described using a voltage signal (hereinafter, referred to as a gyro voltage) as an example of the raw data.

The camera 140 may photograph a fixed environment, such as a ceiling or a wall, and provide image data obtained by photographing the fixed environment to the main processor 130. The camera 140 may include, for example, a charge coupled device (CCD), a complementary metal oxide semiconductor (CMOS), a contact image sensor (CIS), or any other image sensor.

The motor 151 may power the mobile robot 100 to move. The motor 151 may be any type of motor that can move the mobile robot 100, such as a rotary motor, a step motor, or a linear motor. Two or more wheels connected to the motor 151 may be used in order to move the mobile robot 100, although other techniques for moving the robot may equally be used.

The encoder 152 may be connected to the motor 151 and may sense the rotation velocity of the motor 151. In so doing, the encoder 152 may measure a location change (i.e., a change between a previous location and a current location of the mobile robot 100) and a direction change of the mobile robot 100. The encoder 152 is generally designed to command the mobile robot 100 to change its location or direction and control the movement of the mobile robot 100 when the mobile robot 100 moves in response to the command. If the encoder 152 is used, the current location and rotation angle of the mobile robot 100 may be obtained by integrating the distance traveled by the mobile robot 100 and the direction in which the mobile robot 100 traveled. If no integration error occurs, the mobile robot 100 may be localized using the encoder 152 only. However, although the encoder 152 is relatively accurate when used for a short period of time, it typically accumulates errors at each sampling.

The main processor 130 may include, for example, a rotation angle calculation unit 131, a reference angular velocity calculation unit 132, and a motor control unit 133.

The rotation angle calculation unit 131 may analyze a plurality of pieces of image data and calculate the rotation angle or head angle of the mobile robot 100. The head angle generally denotes an angle between a reference direction at absolute coordinates and a direction faced by the front of the mobile robot 100. The rotation angle generally denotes an angle by which the mobile robot 100 is actually rotated for a predetermined period of time. Therefore, the rotation angle may be represented as the difference between head angles at two points of time.

The detailed operation of the rotation angle calculation unit 131 will be described later with reference to FIG. 4.

The motor control unit 133 may receive encoder data from the encoder 152 and control the motor 151 using a control signal. The encoder data generally denotes raw data output from the encoder 152. For calibration, the motor control unit 133 may rotate the mobile robot 100 in a predetermined pattern.

The reference angular velocity calculation unit 132 may calculate encoder parameters using the calculated rotation angle and encoder data corresponding to the calculated rotation angle. The reference angular velocity calculation unit 132 may further calculate a plurality of reference angular velocities using a plurality of pieces of real-time encoder data to the calculated encoder parameters. The gyro processor 120 may directly perform calibration using the rotation angle calculated by the rotation angle calculation unit 131. However, since calculating the rotation angle using image data captured by the camera 140 typically cannot be performed consecutively (for example, calculating the rotation angle whenever the mobile robot 100 rotates 90 degrees), the reference angular velocities may be calculated using the encoder data.

The detailed process of calculating the reference angular velocities will be described later with reference to FIGS. 6 and 7.

The gyro processor 120 may calculate a scale factor based on the relationship between the reference angular velocities provided by the main processor 130 and the gyro voltages provided by the gyrosensor 110. Then, the gyro processor 120 may calculate the angular velocity of the mobile robot 100 by applying a gyro voltage, which is input in real time, to the calculated scale factor.

The gyro processor 120 may include, for example, a data storage unit 121, a scale factor calculation unit 122, and an angular velocity calculation unit 123.

The data storage unit 121 typically stores a plurality of pairs (data pairs) of gyro voltages and reference angular velocities at regular time intervals.

The scale factor calculation unit 122 typically applies the WLS technique to the stored data pairs and calculates a scale factor indicating the relationship between the gyro voltages and the reference angular velocities. A detailed method of calculating a scale factor will be described later with reference to FIGS. 7 through 9.

The angular velocity calculation unit 123 may apply a gyro voltage, which is input in real time, to the calculated scale factor and calculate the angular velocity of the mobile robot 100 in real time. If the scale factor calculation unit 122 updates the scale factor, the angular velocity calculation unit 123 may calculate the angular velocity of the mobile robot 100 using the updated scale factor.

Figure 4:
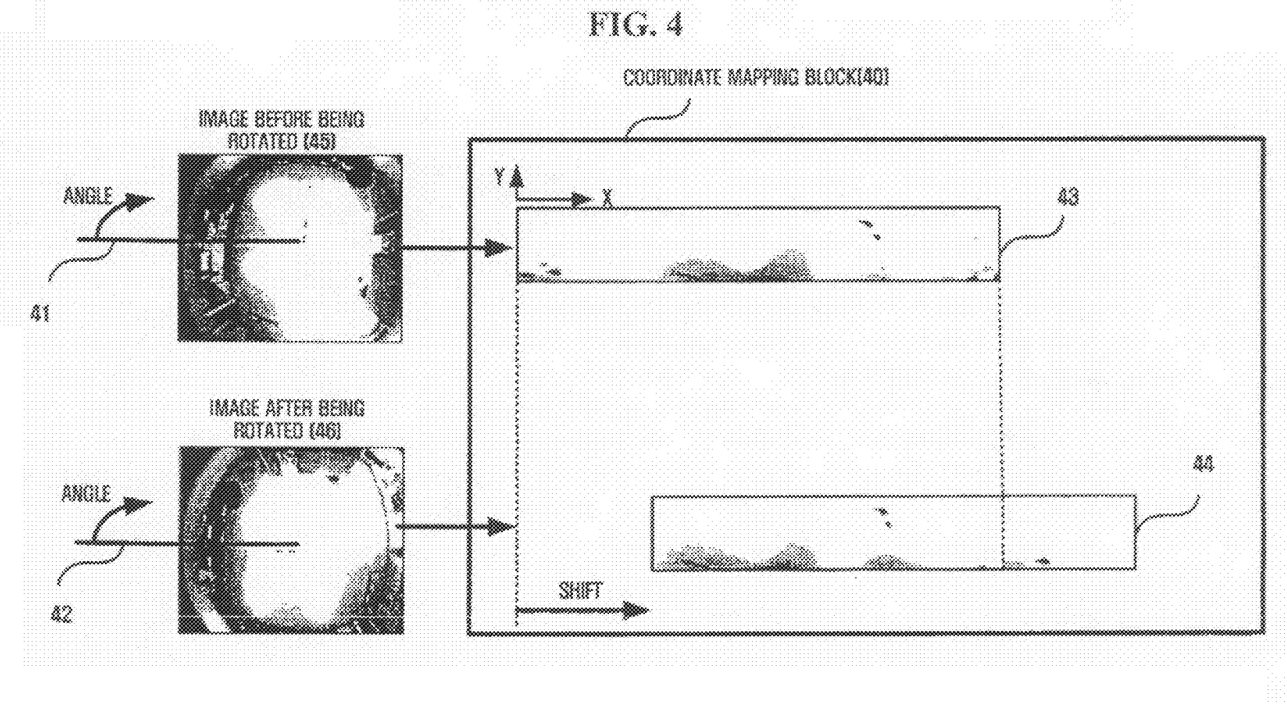
FIG. 4 explains a process of calculating a rotation angle using a rotation calculation unit.

FIG. 4 explains a process of calculating a rotation angle using the rotation calculation unit 131.

The motor control unit 133 may rotate the mobile robot 100 with respect to a ground surface and a vertical axis when the mobile robot 100 changes its direction or is not moving. It may be desirable for the mobile robot 100 to rotate while remaining stationary in order to calculate a rotation angle more accurately.

Figure 5:
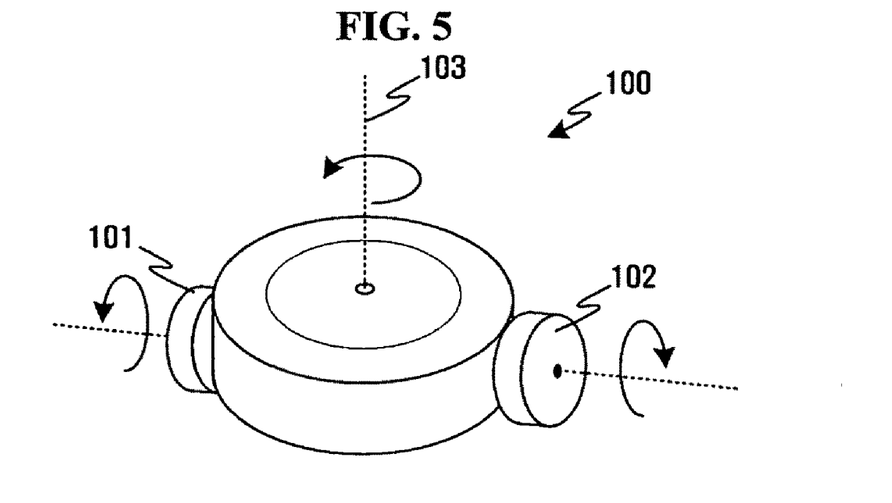
FIG. 5 illustrates a mobile robot which rotates using its two wheels while remaining in a fixed location.

As illustrated in FIG. 5, the mobile robot 100 may rotate without moving, e.g., by using two wheels 101 and 102. If the motor control unit 133 controls the motor 151 to rotate the two wheels 101 and 102 at the same velocity and in opposite directions, the mobile robot 100 rotates with respect to a ground surface and a vertical axis 103.

When the mobile robot 100 rotates, an image captured by the camera 140 is also rotated by the rotation angle of the mobile robot 100. The camera 140 may obtain image data of the image before being rotated and image data of the image after being rotated and provide the obtained image data to the rotation angle calculation unit 131.

The rotation angle calculation unit 131 may compare the image before being rotated to the image after being rotated while rotating the image before being rotated and may find a rotation angle at which the difference between the two images is a minimum. Since an image obtained after rotating the image by the found rotation angle cannot perfectly match the image after being rotated, a technique for quantifying the difference between the two images may be required. An example of such a technique is a Lucas-Kanade algorithm.

Referring to FIG. 4, the rotation angle calculation unit 131 may use a coordinate mapping block 40. The coordinate mapping block 40 typically obtains first and second polar coordinate images 43 and 44, in which an X-axis indicates angle and a Y-axis indicates distance, based on images 45 and 46 captured by the camera 140. The origins of the first and second polar coordinate images 43 and 44 may be determined based on reference lines 41 and 42 of the images 45 and 46 before being mapped to coordinates. The reference lines 41 and 42 may be arbitrarily determined using optical center points of the images 45 and 46 as end points. The image 46 obtained when the rotation of the mobile robot 100 is terminated may be delayed by a predetermined period of time compared to the image 45 obtained when the mobile robot 100 received a command to rotate.

The rotation angle calculation unit 131 typically compares the first and second polar coordinate images 43 and 44 while shifting the second polar coordinate image 44 at regular angle intervals along a positive direction of the X-axis. For example, if the X-axis has a range of 0 to 360 degrees, the rotation angle calculation unit 131 may shift the second polar coordinate image 44 to the right at intervals of one degree and compare an image obtained after shifting the second polar coordinate image 44 to the first polar coordinate image 43. Since the X-axis of the second polar coordinate image 44 indicates angle, a portion of the second polar coordinate image 44, which exceeds 360 degrees, may be rotated to zero degree of the X-axis.

In this way, whenever the second polar coordinate image 44 is shifted along the positive direction of the X axis at intervals of one degree, a difference value (hereinafter, referred to as an "image information difference value") between information regarding the first polar coordinate image 43 and information regarding the second polar coordinate image 44, which corresponds at each of 360 degrees (0 to 359 degrees) that are consecutive at intervals of one degree, may be obtained. In this case, the image information difference value may be obtained for each of the 360 degrees. In addition, the image information difference values may be respectively squared and then added. The sum of the squared image information difference values may be defined in an embodiment as a sum of squared distance (SSD).

The rotation angle calculation unit 131 may determine the rotation angle of an image when the SSD is at a minimum as the rotation angle of the mobile robot 100.

Figure 6:
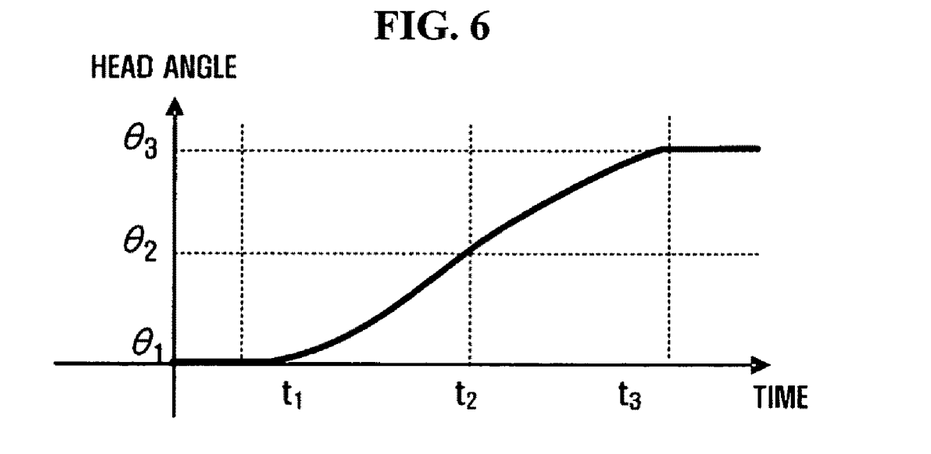
FIG. 6 illustrates head angles calculated at three distinct times.
Figure 7:
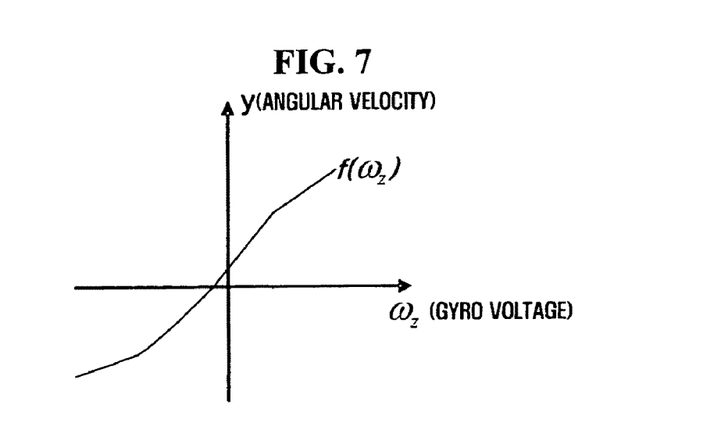
FIG. 7 illustrates the relationship between a gyro voltage and an angular velocity.

FIGS. 6 and 7 explain the operation of the reference angular velocity calculation unit 132. In particular, FIG. 6 is a graph illustrating head angles $\theta_1$, $\theta_2$ and $\theta_3$ calculated by the rotation angle calculation unit 131 at three times: $t_1$, $t_2$ and $t_3$.

A rotation angle $\Delta\theta_{en}$ generally measured by the encoder 152 may be modeled as Equation (1) below. In Equation (1), $k_1$ and $k_2$ indicate proportionality constants.

$$\Delta\theta_{en} = \frac{k_1 \Delta U_R - k_2 \Delta U_L}{D} = \alpha_1 \Delta U_R - \alpha_2 \Delta U_L, \quad \text{Equation (1)}$$

where $\Delta U_L$ indicates encoder displacement of a left wheel (which may be calculated using the number of encoder pulses), and $\Delta U_R$ indicates encoder displacement of a right wheel. In addition, D indicates the distance between the right and left wheels, and $\alpha_1$, and $\alpha_2$ may be defined as encoder parameters. That is, the encoder parameters $\alpha_1$ and $\alpha_2$ may be defined as coefficients when a rotation angle calculated by the rotation angle calculation unit 131 is represented as a linear combination of respective encoder displacements of the wheels of the mobile robot 100.

In fact, the encoder parameters $\alpha_1$ and $\alpha_2$ are not values that may generally be identified accurately because they vary according to the traveling environment of the mobile robot 100. Therefore, even if the values of the encoder parameters $\alpha_1$ and $\alpha_2$ are provided to a manufacturer of the mobile robot 100, errors may inevitably occur when the mobile robot 100 actually travels.

Therefore, it may be necessary to calculate the encoder parameters $\alpha_1$ and $\alpha_2$ by comparing the rotation angle calculated by the rotation angle calculation unit 131 to the encoder displacement corresponding to the calculated rotation angle. Equation (2) below shows a method of calculating the encoder parameters $\alpha_1$ and $\alpha_2$.

$$\Delta\theta_{12} = \alpha_1 \Delta U_{R,t12} - \alpha_2 \Delta U_{L,t12}$$

$$\Delta\theta_{23} = \alpha_1 \Delta U_{R,t23} - \alpha_2 \Delta U_{L,t23}, \quad \text{Equation 2}$$

where $\Delta\theta_{12}$ and $\Delta\theta_{23}$ denote a rotation angle between the times $t_1$ and $t_2$ and a rotation angle between the times $t_2$ and $t_3$, respectively. Therefore, $\Delta\theta_{12}$ and $\Delta\theta_{23}$ may be represented as $\theta_2-\theta_1$ and $\theta_3-\theta_2$, respectively. In addition, $\Delta U_{R,t12}$ and $\Delta U_{L,t12}$ respectively indicate encoder displacements of the right and left wheels between the times $t_1$ and $t_2$, and $\Delta U_{R,t23}$ and $\Delta U_{L,t23}$ respectively indicate encoder displacements of the right and left wheels between the times $t_2$ and $t_3$.

The reference angular velocity calculation unit 132 may obtain the encoder parameters $\alpha_1$ and $\alpha_2$ using Equation (2), for example. Values of the encoder parameters $\alpha_1$ and $\alpha_2$ may be fixed until rotation angles updated by the rotation angle calculation unit 131 are provided.

Once the encoder parameters $\alpha_1$ and $\alpha_2$ are determined, the reference angular velocity calculation unit 132 may calculate angular velocities by applying encoder data, which is input in real time from the motor control unit 133, to the encoder parameters $\alpha_1$ and $\alpha_2$ and provides the angular velocities to the gyro processor 120. Since the angular velocities obtained by the reference angular velocity calculation unit 132 are used for calibration of the gyro processor 120, they may be defined as 'reference angular velocities.'

Figure 8:
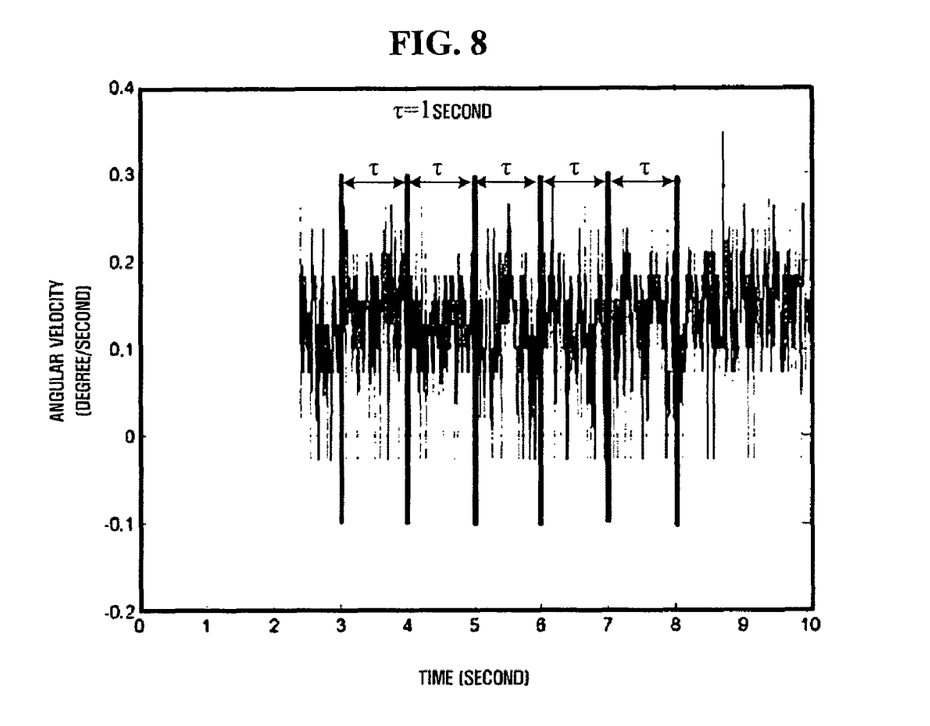
FIG. 8 illustrates a bias drift of a gyrosensor when the mobile robot is not moving.
Figure 9:
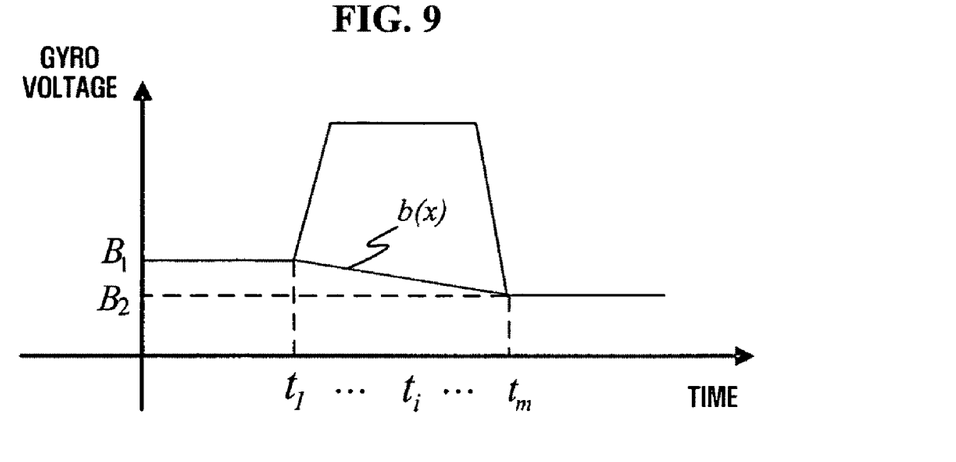
FIG. 9 illustrates an example of estimating a bias when the mobile robot is moving.

FIGS. 7 through 9 are graphs for explaining the operation of the scale factor calculation unit 122.

In particular, FIG. 7 is a graph illustrating the relationship between a gyro voltage $\omega_z$ and an angular velocity y. A process of calculating a function $f(\omega_z)$ may be understood as a process of calculating a scale factor (a calibration process).

Generally, the relationship between the gyro voltage $\omega_z$ and a physically significant value, that is, the angular velocity y, may be modeled as in Equation (3) below.

$$y = f(\omega_z) + B_z + M_x\omega_x + M_y\omega_y + B_{gx}a_x + B_{gy}a_y + B_{gz}a_z, \quad \text{Equation (3)}$$

where $f(\omega_z)$ indicates a function in which a scale factor is applied to a gyro voltage, and $B_z$ indicates a bias term and a constant. In addition, $M_x\omega_x + M_y\omega_y$ is a coupling term, and $B_{gx}a_x + B_{gy}a_y + B_{gz}a_z$ is a gravity component term. Since terms excluding $f(\omega_z)$ and $B_z$ hardly affect the angular velocity y, they may be omitted.

If the gyro voltage $\omega_z$ is represented by x, and f(x) is an $n^{th}$ order polynomial, f(x) may be given by Equation (4).

$$f(x) = \alpha_0 + \alpha_1 x + \ldots + \alpha_n x^n \quad \text{Equation (4)}$$

Even when the mobile robot 100 is not moving, a bias drift (a variation in bias over time) typically occurs due to device characteristics of the gyrosensor 110.

FIG. 8 illustrates the bias drift of the gyrosensor 110 when the mobile robot 100 is not moving. Generally, inexpensive gyrosensors suffer from more serious bias drift. Since bias drift may significantly affect the accuracy of a gyrosensor in calculating angular velocity, it must also be taken into consideration in the calibration process.

According to a general bias correction technique, a bias measured when the mobile robot 100 is not moving may be subtracted from a real-time gyro voltage. Since the bias constantly varies over time, it may be desirable to update the bias whenever the mobile robot 100 stops. When the mobile robot 100 is moving, an accurate value of the bias cannot be measured. Therefore, a bias measured when the mobile robot 100 is not moving may be interpolated and used to estimate a bias when the mobile robot 100 is moving.

FIG. 9 illustrates an example of estimating a bias when the mobile robot 100 is moving. The mobile robot 100 is stationary until time $t_1$ and moves between times $t_1$ and $t_m$ in a pattern illustrated in FIG. 9. After the time $t_m$, the mobile robot 100 stops again. In the meantime, a gyro voltage varies. In this case, a bias $B_1$ at the time $t_1$ and a bias $B_2$ at the time $t_2$ may have different values. Therefore, a period of time ($t_1$ through $t_m$) during which the mobile robot 100 moves may need to be interpolated using the biases $B_1$ and $B_2$. Various functions (interpolation functions) may be used in this interpolation process. However, in one or more embodiments of the present invention, a linear function may be used as an interpolation function b(x). Once the interpolation function b(x) is determined, a bias value $b(t_i)$ at a time $t_i$ in the period of time during which the mobile robot 100 moves may be obtained. In this specification, $b(t_i)$ will simply be represented by $b_i$.

As described above, after the bias is calculated when the mobile robot 100 is moving, the calculated bias must be subtracted from the gyro voltage. A value obtained after the subtraction, that is, the corrected gyro voltage, typically corresponds to a rotation angle which is a physically significant value.

Therefore, in Equation (4), x may be understood as the corrected gyro voltage. A corrected gyro voltage $x_i$ and a residual $R_i$ at a time index i may be defined by Equation (5).

$$x_i = g_i - b_i$$

$$R_i = [y_i - f(x_i)]^{2'} \quad \text{Equation (5)}$$

where $g_i$, $y_i$ and $b_i$ indicate a gyro voltage before being corrected, an angular velocity and a bias at the time index i. In addition, $f(x_i)$ indicates a function whose coefficients must be finally determined, that is, an objective function.

Calculating coefficients $a_0$ through $a_n$ of the function $f(x_i)$ which minimize the sum of residuals in the entire period of time (i=1 through m) is typically a least square (LS) method. A set of the calculated coefficients $a_0$ through $a_n$ may be a scale factor.

A scale factor may be determined using the simple LS method. However, considering that $b_i$ is an estimated value and that the reliability of $b_i$ varies according to i, the accuracy of the gyrosensor 110 may be enhanced using the WLS technique.

It may be estimated from FIG. 9 that the bias interpolation function b(x) is accurate at least between $t_1$ and $t_m$ and that reliability may be reduced as the distance from the period of time between $t_1$ and $t_m$ increases. Therefore, it is reasonable to assign a lower weight as the distance from a boundary (hereinafter, referred to as a boundary between a mobile state and a stationary state), at which the mobile robot 100 starts to move or stops moving, increases.

Figure 10:
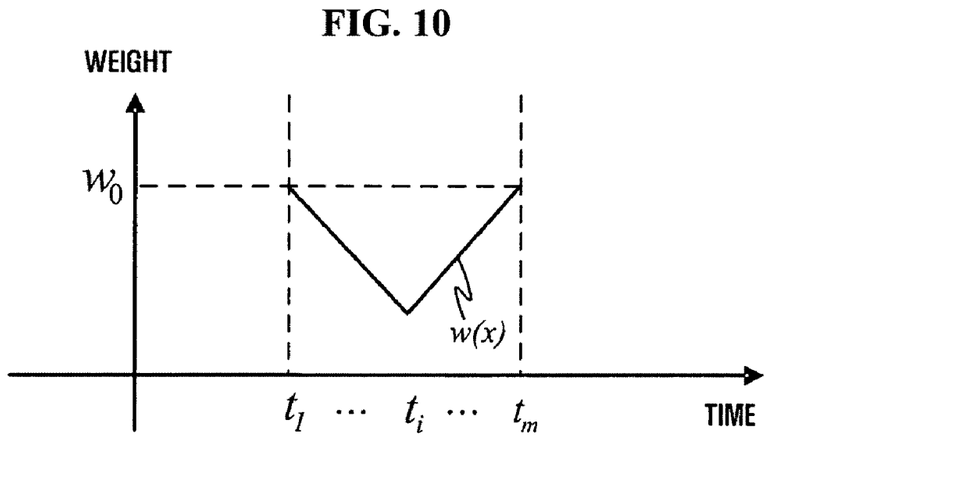
FIG. 10 illustrates an example of a weighted function over time.
Figure 11:
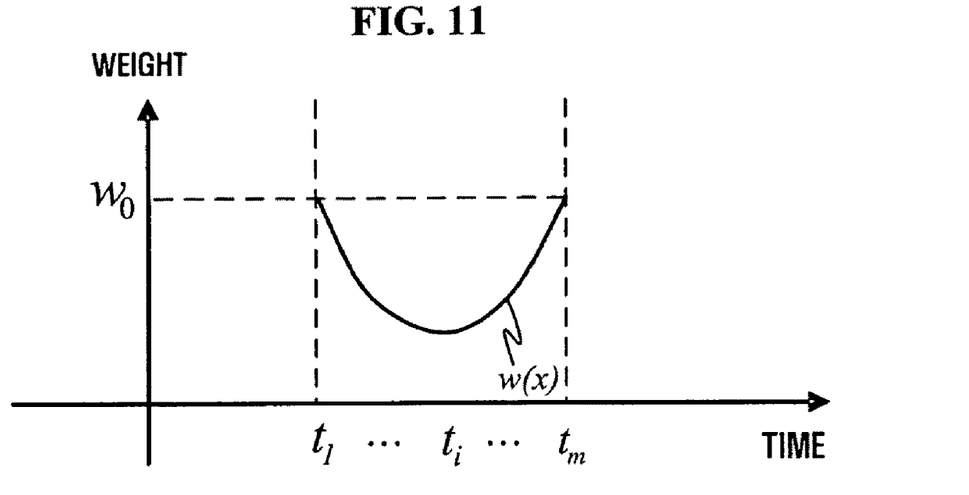
FIG. 11 illustrates another example of the weighted function over time.

FIG. 10 illustrates an example of a weighted function w(x) over time. In the weighted function w (x) illustrated in FIG. 10, a weight is linearly reduced as the distance from both boundaries $t_1$ and $t_m$ increases. The weighted function w(x) may have a curved form as illustrated in FIG. 11 in addition to a linear form illustrated in FIG. 10. Whichever form the weighted function w (x) may have, the weight is reduced as the distance from the both boundaries $t_1$ and $t_m$ increases.

When the WLS technique is used, a weighted sum R of residuals $R_i$, that is, the sum of residuals of Equation (5) to which weights are applied, may be defined by Equation (6).

$$R = \sum_{i=1}^{m} w_i R_i \quad \text{Equation (6)}$$
$$= w_1[y_1 - f(x_1)]^2 + w_2[y_2 - f(x_2)]^2 + \ldots +$$
$$w_m[y_m - f(x_m)]^2$$

A scale factor A which minimizes the weighted sum R may be calculated using Equation (7). In addition, A, X and Y in Equation (7) are defined by Equation (8).

$$A = (X^T X)^{-1} X^T Y \quad \text{Equation (7)}$$

$$A = \begin{bmatrix} a_0 \\ a_1 \\ \vdots \\ a_n \end{bmatrix} \quad \text{Equation (8)}$$

$$X = \begin{bmatrix} \sum_{i=1}^{m} w_i & \sum_{i=1}^{m} w_i x_i & \cdots & \sum_{i=1}^{m} w_i x_i^n \\ \sum_{i=1}^{m} w_i x_i & \sum_{i=1}^{m} w_i x_i^2 & \cdots & \sum_{i=1}^{m} w_i x_i^{n+1} \\ \vdots & \vdots & \ddots & \vdots \\ \sum_{i=1}^{m} w_i x_i^n & \sum_{i=1}^{m} w_i x_i^{n+1} & \cdots & \sum_{i=1}^{m} w_i x_i^{n+n} \end{bmatrix},$$

$$Y = \begin{bmatrix} \sum_{i=1}^{m} w_i y_i \\ \sum_{i=1}^{m} w_i x_i y_i \\ \vdots \\ \sum_{i=1}^{m} w_i x_i^n y_i \end{bmatrix},$$

Figure 12:
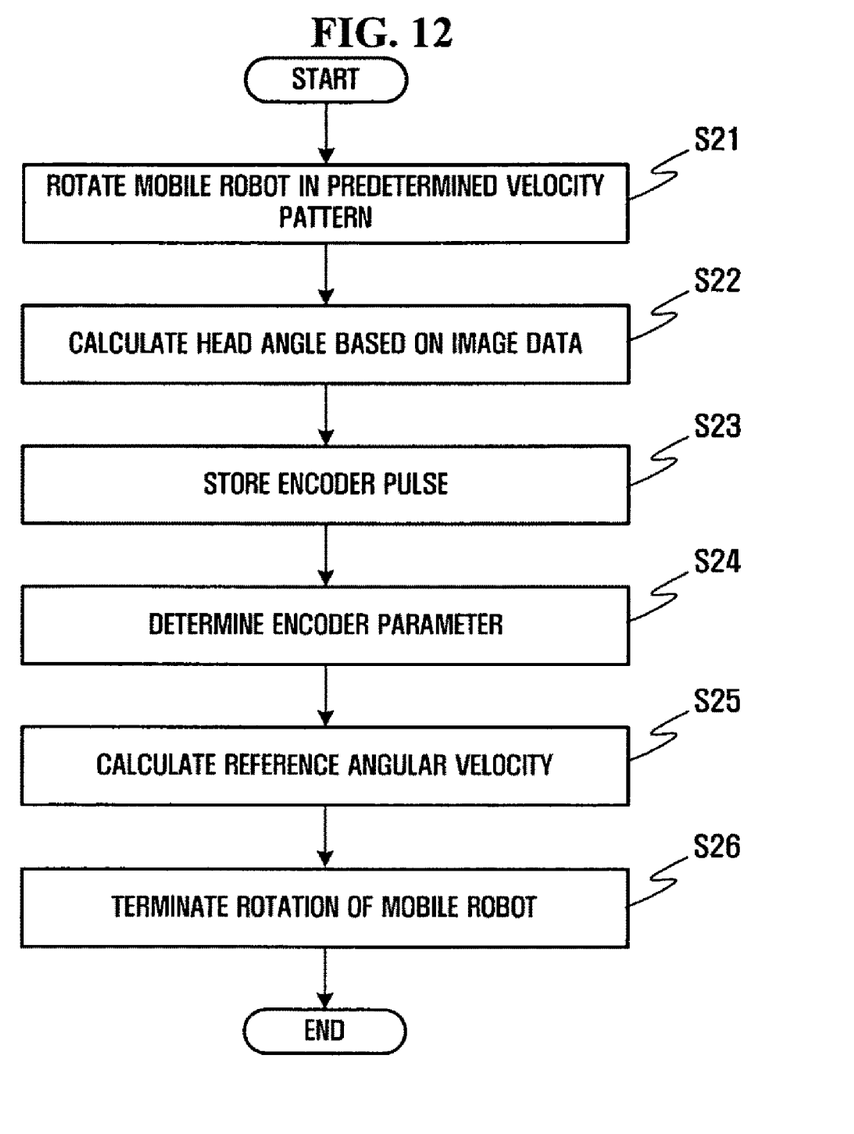
FIG. 12 illustrates the operation of a main processor, according to an embodiment of the present invention.

FIG. 12 illustrates the operation of the main processor 130. Referring to FIG. 12, the motor control unit 133 may transmit a control signal to the motor 151 and rotate the mobile robot 100 in a predetermined velocity pattern in operation S21. The predetermined velocity pattern may be any pattern such as uniform velocity. The camera 140 may capture image data at a predetermined location (for example, at intervals of 90 degrees) when the mobile robot 100 rotates and may provide the captured image data to the rotation angle calculation unit 131.

The rotation angle calculation unit 131 may calculate a rotation angle based on the received image data in operation S22. In this case, the rotation angle calculation unit 131 may compare an image before being rotated to an image after being rotated and may find a rotation angle which minimizes the difference between the two images.

While the mobile robot 100 rotates in a predetermined pattern, the motor control unit 133 may store encoder pulses in a predetermined memory (not shown) in operation S23. The number of encoder pulses typically denotes the number of rotations or encoder displacements of the wheels 101 and 102 of the mobile robot 100 for a predetermined period of time.

The reference angular velocity calculation unit 132 may determine encoder parameters using the calculated rotation angle and the encoder displacements in operation S24 and obtain a plurality of reference angular velocities by applying real-time encoder data to the encoder parameters in operation S25. The reference angular velocities may be continuously provided to the gyro processor 120 until the rotation of the mobile robot 100 for calibration is terminated in operation S26.

Figure 13:
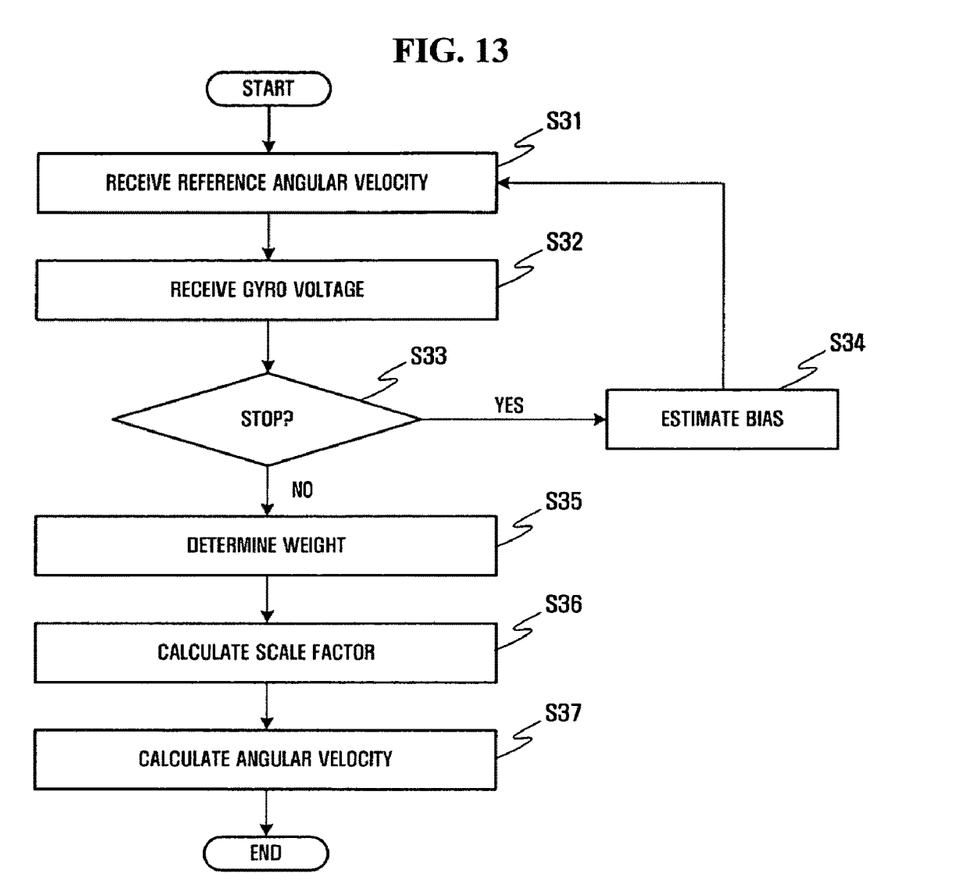
FIG. 13 illustrates the operation of a gyro processor, according to an embodiment of the present invention.

FIG. 13 illustrates the operation of the gyro processor 120. Referring to FIG. 13, the data storage unit 121 may receive and store a plurality of reference angular velocities provided by the main processor 130 while the mobile robot 100 is rotated for calibration in operation S31. The data storage unit 121 may also receive and store a gyro voltage from the gyrosensor 110 in operation S32. The data storage unit 121 may store a plurality of data pairs of reference angular velocities and gyro voltages while the mobile robot is continuously rotated for calibration.

In order to calculate a scale factor, a bias generally needs to be identified. When the mobile robot 100 stops moving (yes to a question raised in operation S33), the scale factor calculation unit 122 may receive a gyro voltage and estimate the gyro voltage (or the mean of gyro voltages when the mobile robot 100 is not moving) at that time as a current bias.

When the mobile robot 100 is rotating (no to the question raised in operation S33), the scale factor calculation unit 122 may determine a weight for each time index in operation S35. Examples of determining the weight have been described above with reference to FIGS. 10 and 11.

The scale factor calculation unit 122 may calculate a scale factor using the WLS technique and based on the weight and the stored data pairs in operation S36. Alternatively, the scale factor calculation unit 122 may skip operation S35 and apply the simple LS method to the stored data pairs.

The calibration of the gyrosensor 110 may be completed through the above operations. Later, the angular velocity calculation unit 123 may calculate the angular velocity of the mobile robot 100 in real time by applying an input gyro voltage to the calculated scale factor.

Table 1 below shows the experimental results of comparing the angular velocity of the mobile robot 100, which may be calculated using a simple data sheet of a gyrosensor, to that of the mobile robot 100 which may be calculated according to the first embodiment of the present invention. In this experiment, the mobile robot 100 is rotated ten times while remaining stationary, and errors that occurred at each rotation are listed in Table 1. A unit of an error is a degree.

TABLE 1

|   | Using data sheet | According to first embodiment |
|---|---|---|
| 1 | 24.73 | −0.17 |
| 2 | 23.33 | −1.57 |
| 3 | 23.70 | −1.20 |
| 4 | 23.61 | −1.29 |
| 5 | 24.23 | −0.68 |
| 6 | −25.92 | 0.59 |
| 7 | −25.78 | 0.76 |
| 8 | −25.81 | 0.74 |
| 9 | −25.34 | 1.17 |
| 10 | −25.63 | 0.91 |
| Average | 24.83 | 0.99 |

Referring to Table 1, automatic calibration according to the first embodiment of the present invention significantly reduces errors over calibration using a simple data sheet.

Figure 14:
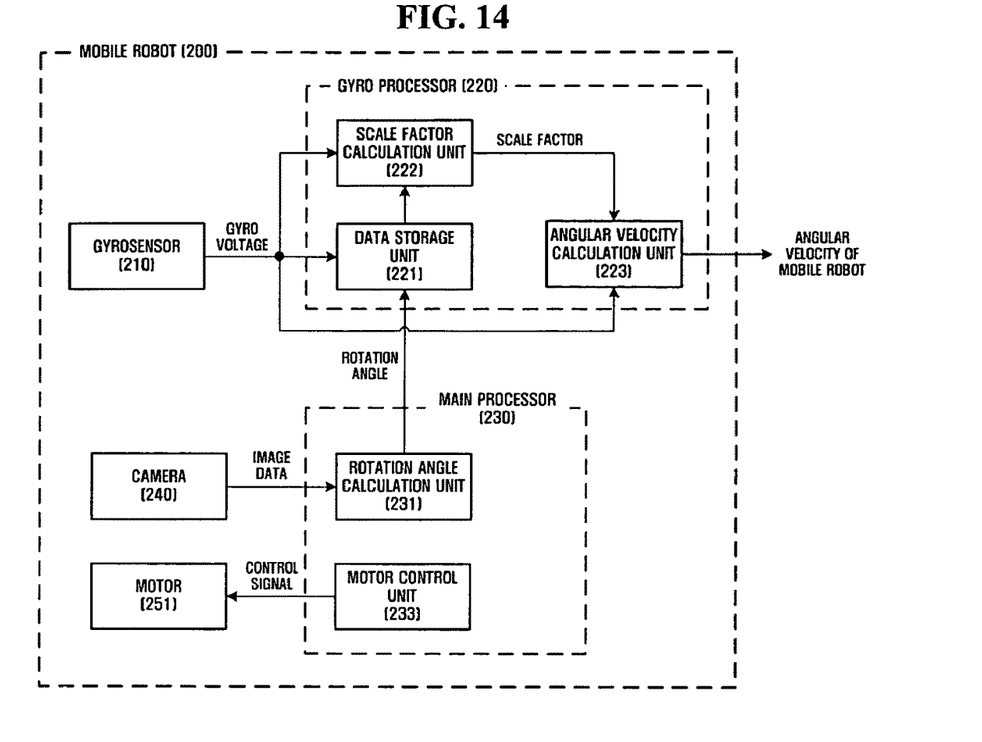
FIG. 14 illustrates a mobile robot, according to a second embodiment of the present invention.

FIG. 14 illustrates a mobile robot 200, according to a second embodiment of the present invention. In the second embodiment of the present invention, a gyro processor 120 may directly perform calibration using a rotation angle calculated by a rotation angle calculation unit 131. Therefore, the mobile robot 200, according to the second embodiment of the present invention has a simpler structure than the mobile robot 100 of FIG. 3 according to the first embodiment of the present invention since the encoder 152 and the reference angular velocity calculation unit 132 may be omitted.

The second embodiment may be different from the first embodiment in that it may have a longer sampling period (e.g., in units of 90 degrees) due to the nature of calculating a head angle using a camera 240. That is, a motor control unit 233 may have to rotate the mobile robot 200 a number of times in order to obtain sufficient sample data about a rotation angle, and the head angle typically must be calculated a number of time based on image analysis. In the first embodiment, sufficient sample data about reference angular velocities may usually be obtained from minimum head angle calculation. Therefore, it is easy to apply the WLS technique. If sufficient sample data about the head angle may also be obtained in the second embodiment, a scale factor calculation unit 222 may use the WLS technique without any problem. A rotation angle calculation unit 231 may calculate a rotation angle for a predetermined period of time. If the calculated rotation angle is divided by the predetermined period of time, angular velocities may be calculated. In the second embodiment, the angular velocities may be provided to a gyro processor 220 as reference angular velocities.

Although the first and second embodiments may be different in how the reference angular velocities are provided, they are typically the same in the process of processing the reference angular velocities using the gyro processor 120 or 220. Therefore, their overlapping descriptions are omitted herein.

Each component described above with reference to FIGS. 3 and 14 may be implemented as a software component, such as a task, a class, a subroutine, a process, an object, an execution thread or a program performed in a predetermined region of a memory, or a hardware component, such as a Field Programmable Gate Array (FPGA) or Application Specific Integrated Circuit (ASIC). In addition, the components may be composed of a combination of the software and hardware components. The components may be reside on a computer-readable storage medium or may be distributed over a plurality of computers.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, according to one or more embodiments of the present invention, a mobile robot may rotate by itself without using an expensive jig, thereby allowing automatic calibration of a gyrosensor.

In addition, according to one or more embodiments of the present invention, calibration performance may be enhanced using the WLS technique, which takes into consideration the bias drift characteristics of the gyrosensor.

Furthermore, according to one or more embodiments of the present invention, since real-time calibration is possible, a variation in scale factor according to the aging and temperature changes of the gyrosensor may be adaptively dealt with.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A system for calibrating a gyrosensor of a mobile robot, the system comprising:
   a camera to obtain image data of a fixed environment;
   a rotation angle calculation unit to calculate a plurality of angular velocities of the mobile robot based on an analysis of the image data;
   the gyrosensor to output a plurality of pieces of raw data according to rotation inertia of the mobile robot; and
   a scale factor calculation unit to calculate a scale factor that indicates the relationship among raw data, a bias of the gyrosensor, and the angular velocities, in order to calibrate the gyrosensor of the mobile robot,
   wherein when the mobile robot moves the bias of the gyrosensor is interpolated between bias values at two positions where the mobile robot stops.

2. The system of claim 1, wherein the fixed environment is a ceiling.

3. The system of claim 1, wherein the pieces of raw data are output voltages of the gyrosensor.

4. The system of claim 1, further comprising a motor control unit to rotate the mobile robot in a predetermined angular velocity pattern.

5. The system of claim 1, wherein the scale factor calculation unit calculates the scale factor by applying a least square method to a plurality of data pairs of the pieces of raw data and the angular velocities.

6. The system of claim 1, wherein a value input to an objective function used in the least square method, is obtained by subtracting the interpolated bias from the raw data.

7. The system of claim 5, wherein the least square method is a weighted least square (WLS) method, and the scale factor calculation unit assigns a weight to each of the data pairs.

8. The system of claim 5, wherein the scale factor is a set of coefficients of a polynomial of a predetermined order.

9. The system of claim 7, wherein a greater weight is assigned as a distance to a boundary between a mobile state and a stationary state of the mobile robot increases.

10. A system for calibrating a gyrosensor of a mobile robot, the system comprising:
    a camera to obtain image data of a fixed environment;
    a rotation angle calculation unit to calculate a rotation angle of the mobile robot based on an analysis of the image data;
    an encoder to output encoder data according to rotation velocity of a motor;
    a reference angular velocity calculation unit to calculate encoder parameters using the calculated rotation angle and encoder data corresponding to the calculated rotation angle and obtaining a plurality of reference angular velocities by applying a plurality of pieces of encoder data to the calculated encoder parameters;
    the gyrosensor to output a plurality of pieces of raw data according to rotation inertia of the mobile robot; and
    a scale factor calculation unit to calculate a scale factor that indicates the relationship among raw data, a bias of the gyrosensor, and the reference angular velocities, in order to calibrate the gyrosensor of the mobile robot,
    wherein when the mobile robot moves the bias of the gyrosensor is interpolated between bias values at two positions where the mobile robot stops.

11. The system of claim 10, wherein the encoder parameters are coefficients when the calculated rotation angle is represented as a linear combination of respective encoder displacements of wheels of the mobile robot.

12. The system of claim 10, wherein the fixed environment is a ceiling.

13. The system of claim 10, wherein the pieces of raw data are output voltages of the gyrosensor.

14. The system of claim 10, further comprising a motor control unit to rotate the mobile robot in a predetermined angular velocity pattern.

15. The system of claim 10, wherein the scale factor calculation unit calculates the scale factor by applying least square method to a plurality of data pairs of the pieces of raw data and the reference angular velocities.

16. The system of claim 10, wherein a value input to an objective function used in the least square method, is obtained by subtracting the interpolated bias from the raw data.

17. The system of claim 15, wherein the least square method is a weighted least square (WLS) method, and the scale factor calculation unit assigns a weight to each of the data pairs.

18. The system of claim 15, wherein the scale factor is a set of coefficients of a polynomial of a predetermined order.

19. The system of claim 17, wherein a greater weight is assigned as a distance to a boundary between a mobile state and a stationary state of the mobile robot increases.

* * * * *